United States Patent [19]

Figgins

[11] Patent Number: 5,193,301
[45] Date of Patent: Mar. 16, 1993

[54] INSULATED FLOATING AC/DC POWER PUMP MINNOW BUCKET

[76] Inventor: James E. Figgins, 1278 Ellen Dr., Zanesville, Ohio 43701

[21] Appl. No.: 942,505

[22] Filed: Sep. 10, 1992

[51] Int. Cl.5 ............................................. A01K 97/04
[52] U.S. Cl. .................................................... 43/57
[58] Field of Search .................... 43/56, 57; 261/121.2; 119/2, 3, 4, 5

[56] References Cited

U.S. PATENT DOCUMENTS

| 2,761,239 | 9/1956 | Stamps | 261/121.2 |
| 3,191,337 | 6/1965 | Fant | 43/57 |
| 4,627,797 | 12/1986 | Rill, Jr. | 43/57 |
| 4,677,785 | 7/1987 | Lambourn | 43/57 |
| 4,757,636 | 7/1988 | Lambourn | 43/57 |
| 4,787,169 | 11/1988 | Maxfield et al. | 43/57 |

Primary Examiner—Richard K. Seidel
Assistant Examiner—Chuck Y. Mah
Attorney, Agent, or Firm—Richard L. Miller

[57] ABSTRACT

A portable bait or minnow bucket comprises an inner bucket for holding bait designed to fit within an insulated receptacle. Two pumps, one AC and the other DC, are located in a water-proof enclosure in the receptacle. A vent tube provides air to the pumps. Upon actuation, the selected pump provides air through a nozzle in the receptacle and air bubbles rise through openings in the bottom of the bucket to aerate the water when the bucket is within the receptacle. The bucket, when removed from the receptacle, will float in the water.

10 Claims, 1 Drawing Sheet

INSULATED FLOATING AC/DC POWER PUMP MINNOW BUCKET

BACKGROUND OF THE INVENTION

1. Field of the Invention

This invention relates to a portable assembly consisting of a bait bucket which fits within a larger receptacle. Pumps located in the receptacle aerate the water in the bucket. When removed from the receptacle, the bucket containing bait will float conveniently in the water.

2. Description of the Prior Art

Fishermen prefer to use fresh bait rather than other types of bait. Fish are known to prefer fresh bait. Fishermen go to great expense to obtain fresh bait. There are many commercially available devices which promise to keep fresh bait alive for a long time. Most of these devices, which are primarily for minnows, shrimp and other similar bait, attempt to maintain the natural habitat of the fish. The most important factors for keeping bait alive are providing water of the appropriate temperature and salinity, the availability of oxygen in the water which is normally provided by aeration, elimination of waste products in the water in which the bait lives, and food for the bait. Many of these devices are bulky, complex and expensive, and do not permit the fisherman to take the bait storage device with him on a fishing trip.

Less expensive and less complex devices exist which permit the fisherman to keep the fresh, live bait in a container which is submerged or which floats in the water being fished. These devices will keep the bait alive for only a short time, and are not useful where it is desired to take live bait to a remote area, or when it is necessary to obtain the bait at a time well prior to when it is used.

The present invention combines the advantages of an inexpensive, portable bait container with those of an aeration device which will keep bait alive for a longer time. This invention utilizes an insulated outer receptacle that contains pumps for providing aeration to the water in which the bait is stored. Air bubbles rise through openings in the bottom of a bait bucket which fits within the receptacle. The inner bucket can be removed from the receptacle and will float in the water near the fisherman for convenience. The receptacle contains its own DC power supply and is sufficiently portable to be taken with the fisherman on a fishing trip. The bait can thus be maintained in a fresh condition until ready for use. The receptacle also has a plug and an AC powered pump for longer term use where AC power is available. The invention is most useful when fresh bait must be obtained prior to the time it is to be used. The bait can be kept alive in the aerated bait bucket within the receptacle for a long period prior to its use, and the bait bucket can then be removed from the receptacle and will float in the water at the fishing site if desired.

The prior art has many portable or floating bait containers, and numerous devices for aerating a bait container. Nothing in the prior art, however, discloses a combination of such devices as taught herein. U.S. Pat. No. 3,972,145 to Key provides an aeration device for a minnow bucket utilizing an air storage chamber and a hand pump. U.S. Pat. No. 4,936,043 to Steele shows a bait container in the form of a foamed plastic chest incorporating a solar cell used to power a pump which aerates the water in the bait container. U.S. Pat. No. 4,945,672 to Raia discloses a water circulation and aerating device located inside a bait container carried in a boat. An inside pump within the container and an outside pump utilizing water from the fishing location maintain the desired water level in the bait container and also regulate the temperature and oxygen content of the water in the container. This latter reference contains a description of a number of other prior art devices.

SUMMARY OF THE INVENTION

A primary object of the present invention is to provide a bait bucket that will overcome the shortcomings of the prior art devices.

It is an object of the present invention to provide a portable, floating bait bucket which fits within a receptacle containing devices for aerating the water in the bait bucket.

Another object of this invention is a portable device for keeping bait alive which has both DC and AC powered pumps and a DC power source permitting aeration of the water in a bait bucket.

A further object of this invention is an insulated receptacle for holding a bait bucket and for aerating the water therein using DC power for portability and AC power where available.

A further object is to provide a bait bucket that is simple and easy to use.

A still further object is to provide a bait bucket that is economical in cost to manufacture.

Further objects of the invention will appear as the description proceeds.

To the accomplishment of the above and related objects, this invention may be embodied in the form illustrated in the accompanying drawings, attention being called to the fact, however, that the drawings are illustrative only and that changes may be made in the specific construction illustrated and described within the scope of the appended claims.

BRIEF DESCRIPTION OF THE DRAWING FIGURES

The figures in the drawings are briefly described as follows.

DETAILED DESCRIPTION OF THE PREFERRED EMBODIMENTS

Figure 1:
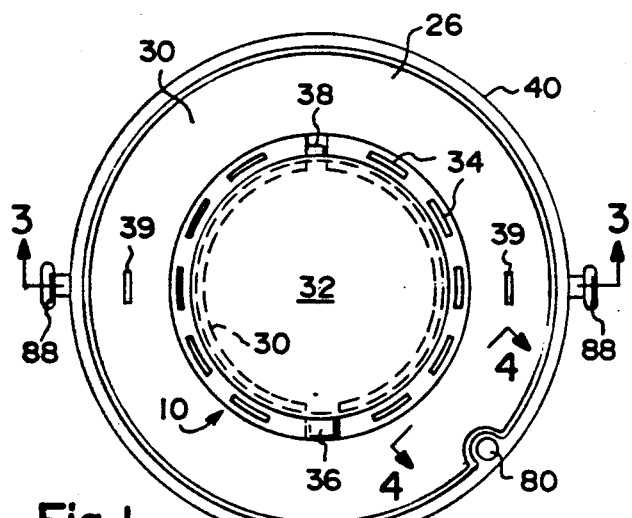
FIG. 1 is a diagrammatic plan view of the present invention taken in the direction of arrow 1 in FIG. 2.

Referring to the Figures where similar reference numerals refer to the same component, a portable bait bucket 10 includes a peripheral side wall 12 and a bottom 14. The bottom 14 is slightly concave in its middle (FIG. 3) and has a circular raised flange 16 extending inwardly and a plurality of openings 18 in a connecting piece 20 within the center of flange 16. The flange 16 provides added strength to bottom 14 and together with openings 18 assists in the formation and dispersion of air bubbles as will be described.

The bait bucket 10 has attached on the inside of side wall 12 at its top a foam filled ring element 22 which enables the bait bucket 10 to float in water. Ring element 22 is held in place by a clamp piece 24 which is connected with and extends outwardly beyond the top of side wall 12 to form a circular lip 26 useful to support the bait bucket 10 within a receptacle generally shown at 28.

Extending inwardly from clamp piece 24 is a flat, circular element 30 which supports a hinged lid 32. There are slits 34 in element 30 which allow air ventilation within the bait bucket 10 (FIG. 1). The lid 32 is hinged at 36 and has a latch at 38. A pair of handle brackets 39 attached to lip 26 permit easy lifting of the bait bucket 10.

Figure 5:
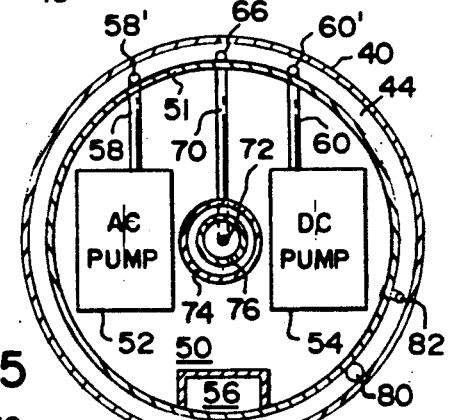
FIG. 5 is a cross sectional view of the invention taken on line 5—5 of FIG. 2.
Figure 3:
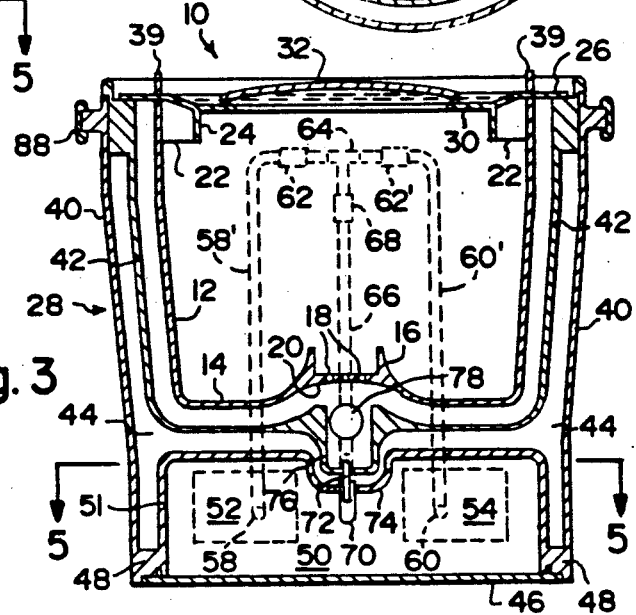
FIG. 3 is a cross sectional view of the invention taken on line 3—3 of FIG. 1.

The receptacle 28, as will be described in detail, has an upper compartment for holding the bait bucket 10 which is constructed to hold water therein, and a water-tight lower compartment which holds the pumps and electrical components. The receptacle 28 has an outer wall 40 and an adjacent inner wall 42, with a layer of insulation 44 therebetween. The insulation 44 serves to keep the water in the upper compartment of the receptacle 28 cool when the bait bucket 10 is within the receptacle 28. The insulation 44 also adds strength to the receptacle 28. A bottom plate 46 is attached to the walls 40 and 42 at the bottom extension thereof using a rubber gasket 48 (FIG. 3) to form a water-tight compartment 50. The top and sides of compartment 50 are formed by a wall 51. The structure of and the components within compartment 50 are best seen in FIGS. 3 and 5.

Compartment 50 contains an AC air pump 52 and a DC air pump 54 which, when actuated, pump air contained in compartment 50 through air lines and a nipple to aerate the water in the bait bucket 10 when the bait bucket 10 is held within the receptacle 28. A DC power supply shown generally at 56, which is preferably a storage battery, is secured within compartment 50 and electrically connected to DC air pump 54 through a switch to be described. Normally only one of the air pumps 52 and 54 is actuated.

The air produced by the selected air pump 52 or 54 is fed through air lines 58 or 60 which extend horizontally from the air pumps 52 and 54 respectively to the insulating layer 44, and then move upwardly through the insulating layer 44. The vertical portion of the air lines 58 and 60 is labeled 58' and 60' and is seen in FIGS. 3 and 5.

Air lines 58' and 60' pass through check valves 62, 62' and into a T-fitting 64. A single air line 66 extends from T-fitting 64 and passes through a check valve 68. Air line 66 then passes downwardly through the insulating layer 44 and forms an angle to enter compartment 50. The air line, shown at 70, then travels horizontally to the center of compartment 50, curving upwardly and forming a nipple 72.

As best seen in FIGS. 3 and 5, wall 51 which forms the top and sides of enclosure 50 has at its center a downwardly extending portion 74 forming a cavity. Air line 70 and nipple 72 pass upwardly through the center of the downwardly extending portion 74. Nipple 72 is molded to the wall 51 where it passes through portion 74. The nipple 72 then passes through a downwardly extending portion 76 of inner wall 42, and is also molded thereto. A short piece of air tubing, forming a nozzle, may be attached to the top of the nipple 72 within the cavity formed by the downwardly extending wall portion 76. Sitting on the top of the nipple 72 (or air tubing) within the cavity formed by wall portion 76 is an air bubble stone 78.

When one of the air pumps 52,54 is actuated to pump air, the air passes through air lines 58,58' or 60,60' into the air lines labeled 66 and 70 and then into nipple 72. Stone 78 will be forced upwardly when the air pressure in the air lines is sufficiently high to raise the stone, and an air bubble will be formed which will rise through openings 18 and into the water in bait bucket 10 to aerate the water. Stone 78 acts to prevent water in the bait bucket 10 from passing downwardly into the air lines.

Figure 4:
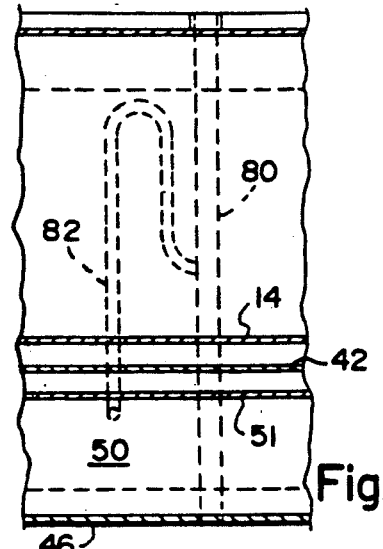
FIG. 4 is an enlarged partial sectional view of the invention taken on line 4—4 of FIG. 1.

A source of air for the air pumps 52 or 54 is provided to the inside of compartment 50 by a vent tube 80 which extends vertically in the insulation 44 between the inside and outside walls 40 and 42 of receptacle 28. The vent tube 80 is open at its ends. As best seen in FIG. 4, a secondary vent tube 82 is connected with and extends from tube 80, terminating with a right angle turn into compartment 50 as shown in FIGS. 4 and 5. The vent tubes 80 and 82 serve to equalize the air pressure between the outside of the device and the compartment 50. An inverted trap is formed as shown in FIG. 4 where the tube 82 extends first upwardly toward the top and then downwardly.

Figure 2:
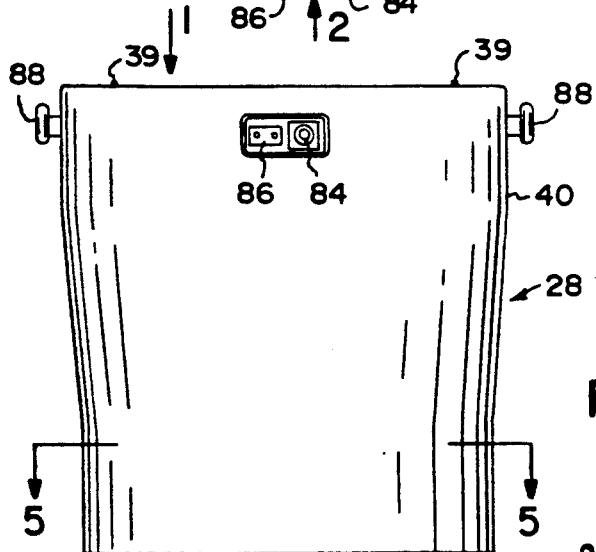
FIG. 2 is a diagrammatic front elevational view of the invention taken in the direction of arrow 2 in FIG. 1.

In order to select either the AC air pump 52 or the DC air pump 54, a DC power switch 84 and an AC plug 86 are located on the outside of wall 40 (FIG. 2). When transporting the device, the switch 84 can be turned on to connect the DC power source 56 to DC pump 54 and actuate the pump 54. Where a source of AC power is available, AC power can be fed through plug 86 to actuate AC pump 52. The electrical wiring for the pumps, not shown, is preferably located in the insulation 44 between walls 40 and 42. The pumps will preferably produce about 120 cubic centimeters of air per minute for an average size device. To enhance portability of the device, handles 88 are located on opposite sides of wall 42.

The bait bucket 10 will sit within the receptacle 28 as shown in FIG. 3. The water in the bait bucket 10 will remain within the cavity in the receptacle 28 formed by inner wall 42. When the device of this invention is being transported, it may be desirable to aerate the bait within the bait bucket 10 by actuating DC air pump 54 by turning on the switch 84. When the fishing spot is reached, the DC air pump 54 will be turned off and the bait bucket 10 removed from the receptacle 28. If desired the bait bucket 10 can float conveniently near the fisherman in the water. Thus, the bait can be aerated to remain fresh until the desired fishing spot is reached, and will remain fresh because it stays in a life supporting environment until it is used. The AC air pump 52 may also be used where AC power is available.

Although this invention has been described with respect to a preferred embodiment thereof, it is apparent that changes may be made to the construction thereof without departing from the scope of the invention as hereinafter claimed.

What is claimed is:

1. A bait bucket assembly comprising:
   a) a bucket having a peripheral side wall and a bottom with a slightly concave center portion extending a short distance inwardly, said center portion having a plurality of openings therein;
   b) floatation means attached to the side wall of said bucket at the top thereof;

c) a receptacle adapted to receive and support said bucket, said receptacle having a bottom, an exterior wall and an interior wall with insulation therebetween, said interior wall being shaped slightly larger than said bucket, the bottom of said interior wall having a recess in a center portion, said recess containing a nozzle;

d) the exterior wall of said receptacle extending a distance below the bottom of said interior wall with a bottom plate attached thereto defining a water-tight enclosure containing air pump means;

e) a source of power for said air pump means; and f) a conduit connecting said air pump means through the openings in the bottom of said bucket to aerate the water contained therein; whereby said bucket is removable from said receptacle.

2. A bait bucket assembly as in claim 1 including a vent tube for providing air into said enclosure, said vent tube being located vertically along and inside the insulation of said receptacle.

3. A bait bucket assembly as in claim 1 in which said air pump means includes an AC power air pump and a DC powered air pump.

4. A bait bucket assembly as in claim 3 in which said source of power includes a source of DC power connected with said DC air pump means, said source of DC power being located within said enclosure.

5. A bait bucket assembly as in claim 4 in which said source of power includes a switch for connecting said source of DC power with said DC powered air pump, said switch being located on the outside of the exterior wall of said receptacle.

6. A bait bucket assembly as in claim 4 in which said source of power includes a plug for receiving AC power, said plug being located on the outside of the exterior wall of said receptacle.

7. A bait bucket assembly as in claim 1 in which said nozzle comprises a nipple with a bubble air stone located thereon.

8. A bait bucket assembly as in claim 1 in which said bucket has a lip attached to and extending outwardly from the top of the side wall thereof, said lip being adapted to rest on the top of the inner wall of said receptacle to provide support to said bucket when bucket is positioned within said receptacle 9. A bait bucket assembly as in claim 1 in which said conduit comprises an air supply line located between the interior and exterior walls of said receptacle.

10. A bait bucket assembly as in claim 9 and including a check valve located in the said supply line.

* * * * *